US010397896B2

(12) United States Patent
Fan et al.

(10) Patent No.: US 10,397,896 B2
(45) Date of Patent: Aug. 27, 2019

(54) IP ADDRESS GEO-POSITION DETECTION BASED ON LANDMARK SEQUENCING

(71) Applicant: International Business Machines Corporation, Armonk, NY (US)

(72) Inventors: Si Bin Fan, Beijing (CN); Yu Gu, Cedar Park, TX (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/491,584

(22) Filed: Apr. 19, 2017

(65) Prior Publication Data

US 2018/0310274 A1 Oct. 25, 2018

(51) Int. Cl.
*H04W 64/00* (2009.01)
*H04L 12/26* (2006.01)
(Continued)

(52) U.S. Cl.
CPC .......... *H04W 64/006* (2013.01); *G01S 19/13* (2013.01); *H04L 43/0864* (2013.01);
(Continued)

(58) Field of Classification Search
CPC .. H04W 64/006; G01S 19/13; H04L 43/0864; H04L 43/10; H04L 61/2007; H04L 61/609; H04L 63/1408
(Continued)

(56) References Cited

U.S. PATENT DOCUMENTS 6,947,978 B2 9/2005 Huffman et al.
7,200,658 B2 4/2007 Goeller et al.
(Continued)

FOREIGN PATENT DOCUMENTS

CN 105227689 A 1/2016
EP 0716556 A2 * 6/1996 ......... H04L 12/6402
(Continued)

OTHER PUBLICATIONS

Wang et al., "Towards Street-Level Client-Independent IP Geolocation," NSDI'11 Proceedings of the 8th USENIX conference on Networked systems design and implementation, Mar. 2011, 14 pages.

(Continued)

*Primary Examiner* — Tuan C To

(74) *Attorney, Agent, or Firm* — Patterson + Sheridan, LLP

(57) ABSTRACT

Systems and methods of the present disclosure provide a way to pinpoint where a target device associated with an IP address is physically located within a geographical region. Network-communication delays between landmark devices and the target device are determined and used to generate sequences capturing relative delay relationships between the landmark devices and the target device. The sequences are used to determine a ranking via a sequence-matching approach. For each pair of landmark devices, a geographical boundary that divides the geographical region into a target partition and a second partition is determined. The target partition includes a first landmark device of the pair and the second partition includes a second landmark device of the pair. The target device is located where the target partitions for the pairs overlap. Network tomography can be applied to increase accuracy.

13 Claims, 11 Drawing Sheets

100

Computing Device 104
Location Detector 106
Map 122
Network 102
Target Device 108
IP Address 110
124
Mobile Devices 112
IP Addresses 116
GPSs 114
Computing Devices 118
IP Addresses 120

(51) Int. Cl.
*H04L 12/751* (2013.01)
*G01S 19/13* (2010.01)
*H04L 29/06* (2006.01)
*H04L 29/12* (2006.01)

(52) U.S. Cl.
CPC .......... *H04L 43/10* (2013.01); *H04L 61/2007* (2013.01); *H04L 61/609* (2013.01); *H04L 63/1408* (2013.01)

(58) Field of Classification Search
USPC .......................................................... 701/469
See application file for complete search history.

(56) References Cited

U.S. PATENT DOCUMENTS 7,366,919 B1 4/2008 Sobel et al.
8,677,017 B2 3/2014 Xu et al.
9,112,667 B1 8/2015 Woodcock
9,686,646 B1* 6/2017 Pecard .................. H04W 4/021
2005/0071417 A1 3/2005 Taylor et al.
2008/0175166 A1* 7/2008 Oerton .................. H04W 48/16 370/254
2010/0317420 A1* 12/2010 Hoffberg ............ G06Q 30/0207 463/1
2013/0166736 A1 6/2013 Sainnsbury
2014/0046802 A1* 2/2014 Hosein ............... G01R 1/06711 705/26.61
2014/0309864 A1* 10/2014 Ricci ....................... H04W 4/21 701/36
2016/0029340 A1* 1/2016 Woodcock, IV ... H04W 64/003 455/456.2
2016/0191399 A1* 6/2016 Suri .................... H04L 43/0882 709/219
2016/0192235 A1* 6/2016 Ahluwalia .............. H04L 69/22 370/329
2016/0381725 A1* 12/2016 Spinelli ................. H04W 92/02 370/329
2017/0311249 A1* 10/2017 Lopes ................... H04W 76/30
2017/0332192 A1* 11/2017 Edge ..................... H04W 64/00
2017/0367026 A1* 12/2017 Li ......................... H04W 12/06
2018/0019802 A1* 1/2018 Teague ............... H04B 7/18506

FOREIGN PATENT DOCUMENTS

KR 20080060054 A * 7/2008
KR 101213237 B1 * 12/2012
WO WO-2017049512 A1 * 3/2017 ............ H04W 74/08

OTHER PUBLICATIONS

Duffield, “Simple network performance tomography,” 2003 (Available online) http://citeseerx.ist.psu.edu/viewdoc/summary?doi=10.1.1.387.7354.

Gueye et al., “Constraint-Based Geolocation of Internet Hosts,” IEEEVACM Transactions on Networking, 2006, 6 pages.

Wong et al., “Octant: A Comprehensive Framework for the Geolocalization of Internet Hosts,” 2007 (Accessed on Apr. 11, 2017) https://www.usenix.org/conference/nsdi-07/octant-comprehensive-framework-geolocalization-internet-hosts.

Youn, Inja. “Stochastic Methods for Geolocation of Internet Hosts,” PhD diss., George Mason University, 2008, 57 pages.

Laki, Sándor, et al., “A Model Based Approach for Improving Router Geolocation,” Computer Networks 54, No. 9, 2010, pp. 1490-1501.

Katz-Bassett, Ethan, et al., “Towards IP Geolocation using Delay and Topology Measurements,” Proceedings of the 6th ACM SIGCOMM Conference on Internet Measurement, pp. 71-84, ACM, 2006.

* cited by examiner

IP ADDRESS GEO-POSITION DETECTION BASED ON LANDMARK SEQUENCING

BACKGROUND

An Internet Protocol (IP) address is an identifier associated with a device (e.g., a computer, printer, router, mobile device, or Internet-of-Things (IoT) device) connected to a Transmission Control Protocol/Internet Protocol (TCP/IP) network. TCP/IP refers to the conceptual model and communications protocols used by the Internet and similar computer networks. An IP address may be associated with hardware such as network interface card (NIC) on the associated device or with a virtual resource executing on the device (e.g., in a virtual local area network).

There are several versions of Internet protocol, such as version 4 (IPv4, which defines an IP address as a 32-bit number) and version 6 (IPv6, which defines an IP address as a 128-bit number). The Internet Assigned Numbers Authority (IANA) has assigned IP addresses to five regional Internet registries (RIR) in blocks of approximately 16.8 million addresses each. Those IP address space are assigned to end users and local Internet registries (Internet service providers). Each Internet service provider or private network administrator assigns IP addresses to each device connected to the provider's respective network. The assignments may be static or dynamic.

Like all devices connected to the Internet, hosts that distribute malware have IP addresses. Once a host is known to be malicious, the host's IP address can be added to a blacklist to apprise other network users of the danger of communication with that host. In some cases, a malicious host's physical location is not immediately known. However, since the host has an IP address, methods for detecting geographical location based on IP address can be useful for tracking down the hardware from which malicious content is distributed.

SUMMARY

One embodiment disclosed herein includes a method for determining a geographical location of a target device associated with a network address used for communicating within a network. The method generally includes determining, for each landmark device in a set of landmark devices, a corresponding network-communication delay between the landmark device and the target device; generating a first sequence of the set of landmark devices, wherein each landmark device is positioned in the first sequence according to the corresponding network-communication delay between the landmark device and the target device; determining, for each landmark device in the set of landmark devices, a respective network-communication delay between the landmark device and each other landmark device in the set of landmark devices; generating, for each landmark device in the set of landmark devices, a respective sequence of the other landmark devices in the set of landmark devices, wherein each other landmark device is positioned in the respective sequence according to the respective network-communication delay between the landmark device and the other landmark device; generating, based on the first sequence and based on each respective sequence, a ranking of the landmark devices relative to the target device; identifying a plurality of pairs of landmark devices in the set of landmark devices; for each pair of landmark devices and based on the ranking, determining a boundary that divides the geographical region into a target partition and a second partition, wherein the target partition includes a first landmark device of the pair and the second partition includes a second landmark device of the pair; and determining a first mutual-overlap area that overlaps with the target partition of each pair, wherein the first mutual-overlap area encompasses the geographical location of the target device.

Another embodiment includes non-transitory computer-readable storage medium containing instructions that, when executed by one or more processors, perform the method for determining a geographical location of a target device associated with a network address used for communicating within a network.

Still another embodiment includes one or more processors and memory storing one or more applications that, when executed on the one or more processors, perform the method for determining a geographical location of a target device associated with a network address used for communicating within a network.

DETAILED DESCRIPTION

Figure 1:
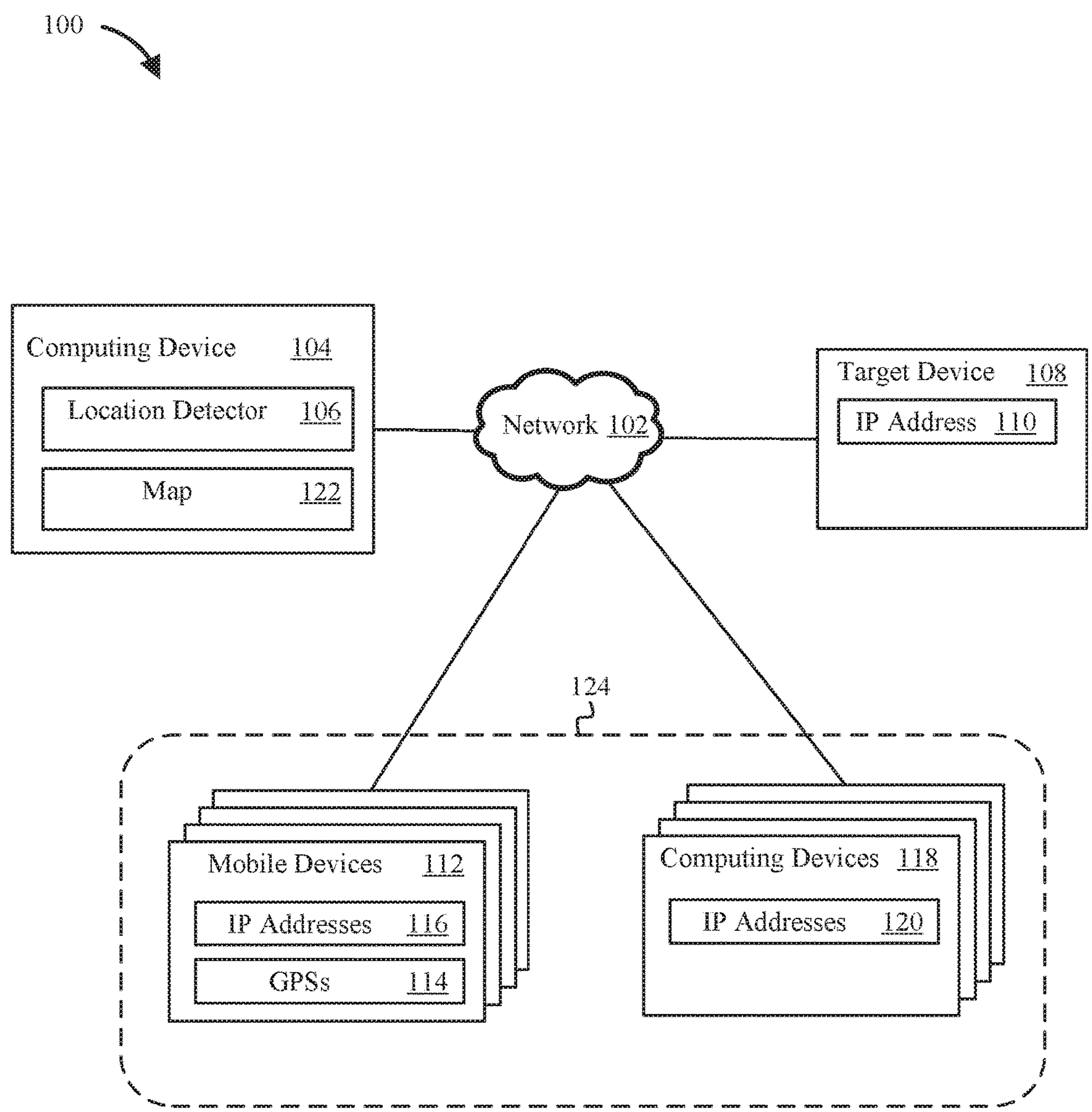
FIG. 1 illustrates a computing environment in which technology of the present disclosure can operate, according to one embodiment.

Cyberattacks cost companies hundreds of billions of dollars each year. To trace the source of such a cyberattack, it is helpful to pinpoint a geographical location from which the cyberattack originated. Oftentimes, an Internet Protocol (IP) address from which the cyberattack originated serves as a starting point.

There are several existing approaches for estimating the geographical location of a device associated with a particular IP address. Commercial IP geolocation products use a database that maps blocks of IP addresses to estimated locations. This approach, though, can only be as accurate as the entries in the database. Obsolete entries and internal inconsistencies between entries therefore limit accuracy. In addition, the database may have to grow at an exponential rate to stay current. Furthermore, it is not uncommon for two IP addresses from the same block to be associated with devices in different geographical locations.

Another approach involves using active measurements using a distributed network of servers and a small number of landmark devices with known locations to estimate the location of a device associated with a target IP address. This approach may successfully detect when a device associated with a target IP address moved to a different location. However, non-linear correspondence between geographical distance and internet distance can lead to relatively large margins of error. Data packets travel through fiber optic cables within the Internet at almost two thirds of the speed of light. Measurement errors and fluctuations from packetization, network congestion, and other factors can introduce variations in transfer rates—and an error of one tenth of a millisecond can translate to an error of twenty kilometers relative to the location of a device. Furthermore, data packets between two end hosts in the Internet travel much more than the actual geographic distance between the hosts due to circuitous paths and multi-hop communications. As a result, current state-of-the art solutions have an error bound measured in tens of kilometers.

Embodiments presented herein describe systems and methods for determining a geographical location of a target device associated with an IP address with increased accuracy relative to existing approaches. Embodiments described herein leverage relative relationships between network-communication delays to pinpoint where a target device is located. Furthermore, embodiments described herein also provide a way to leverage mobile devices to increase the number of landmarks that can be used in a process of location a target device. Also, some embodiments leverage network tomography to achieve an even finer-grained determination of where a target device is located.

In one example, the target device is a network host (e.g., a computer) operating at an unknown or undisclosed geographical location. The target device uses an Internet Protocol (IP) address to communicate over a network (e.g., the Internet). To determine the location of the target device, a number of actions are performed. First, an initial set of landmark devices (referred to herein as $W_{initial}$) is identified. In general, any device that is connected to the network and is positioned at a known (or readily ascertainable) geographical location can serve as a landmark device. For example, if an IP address of a host is associated with a well-known domain name, the geographical location of the host may be recorded in a searchable data repository (e.g., in a Domain Name Servers Location (DNS LOC) record). Hence, the host can serve as a landmark device. In addition, an internet-connected mobile device with a global positioning system (GPS) can also serve as a landmark device because the GPS can readily report the location of the mobile device.

There are a number of ways that can be used to determine how many landmark devices to include in $W_{initial}$. For example, suppose potential landmark devices are located in a geographical region whose geometric area is denoted as x (e.g., measured in square miles or square kilometers). Also suppose the location of the target device should be narrowed down to a smaller section within the geographical region—a section that should, on average, have an area denoted as y (e.g., measured in square miles or square kilometers). The minimum number of landmark devices to include in $W_{initial}$ can be defined as $$\left\lceil \left(\frac{x}{y}\right)^{\frac{1}{4}} \right\rceil$$

or, equivalently, $$\left\lceil \sqrt[4]{\frac{x}{y}} \right\rceil,$$

where ⌈ ⌉ denotes the ceiling function (e.g., which rounds to the smallest integer that is greater than or equal to $$\sqrt[4]{\frac{x}{y}}\Big).$$

Thus, in this example, the minimum number of landmark devices to include in $W_{initial}$ may be referred to as the smallest integer that is greater than or equal to the quartic root of the quotient of x (the dividend) and y (the divisor). In other examples, the number of landmark devices to include in $W_{initial}$ can be defined in other ways.

After the initial set $W_{initial}$ of landmark devices is identified, a corresponding network-communication delay between each landmark device in $W_{initial}$ and the target device can be determined. In more formal terms, suppose there are N landmarks, where N is a positive integer. (In other words, $N \in \mathbb{N}$, where $\mathbb{N}$ is the set of natural numbers). Also suppose $L_i$ denotes a specific landmark, where $i \in \mathbb{N}$ and $1 \le i \le N$. The corresponding delay between a given landmark device $L_i$ and the target device τ can be denoted as $d_{i,\tau}$. Collectively, the set of delays between the landmark devices and the target device can be denoted as $D_\tau$, where $D_\tau = \{d_{i,\tau} | 1 \le i \le N\}$.

In addition, pairwise network-communication delays between the landmark devices are determined. Since there are N landmark devices, there are $$\binom{N}{2} = \frac{N!}{2!(N-2)!}$$

pairs of landmark devices in $W_{initial}$. The delay between a landmark device $L_i$ and a landmark device $L_j$ can be denoted as $d_{i,j}$, where $j \in \mathbb{N}$, $1 \le j \le N$, and $j \ne i$. Collectively, the set of delays between the landmark devices can be denoted as $D_L$, where $D_L = \{d_{i,j} | 1 \le i \le N, 1 \le j \le N, i \ne j\}$. It should be noted that $D_\tau$ and $D_L$ can be determined in any order or in parallel. $D_\tau$ and $D_L$ are only referred to as separate sets to facilitate explanation of how certain embodiments operate; no limitation on the order in which delays are determined is intended.

After the set of delays $D_\tau$ has been determined, the landmark devices are sorted into a first sequence $S_\tau$ (e.g., a permutation) based on the corresponding network-communication delays in $D_\tau$. For example, in one embodiment, the landmark devices are sorted in monotonically increasing order (e.g., ascending order) in $S_\tau$ relative to the corresponding network-communication delays in $D_\tau$. In other words, if the landmark device $L_i$ is positioned before the landmark device $L_j$ in the sequence $S_\tau$, then $d_{i,\tau} \le d_{j,\tau}$.

After the set of delays $D_L$ has been determined, a respective sequence $S_i$ is generated for each landmark device $L_i$. $S_i$ is a sequence (e.g., permutation) in which the landmark devices other than $L_i$ are sorted based on their corresponding delays to $L_i$ in $D_L$. For example, in one embodiment, the other landmark devices are sorted in monotonically non-decreasing order in $S_i$ relative to the corresponding network-communication delays in $D_L$. Thus, if the landmark device $L_j$ is positioned before the landmark device $L_k$ in the sequence $S_i$, then $d_{i,j} \le d_{i,k}$ (where $k \in \mathbb{N}$, $1 \le k \le N$, $k \ne j$, and $k \ne i$). In practice, if no two delays in $D_L$ are equal (i.e., if if $\nexists i, j | d_{i,\tau} = d_{j,\tau}$) the landmark devices can be sorted in ascending order. Note that, in an alternative embodiment, the landmark devices in the sequences $S_i$ and $S_\tau$ can be sorted in monotonically non-increasing order (e.g., descending order).

Once the sequence $S_\tau$ and the N respective sequences $S_1, S_2, \ldots S_N$ have been generated, a ranking R of the landmark devices is generated. In one embodiment, the ranking R is generated by applying a sequence-matching technique, such as maximum a posteriori (MAP), to the sequence $S_\tau$ and the sequences $S_1, S_2, \ldots S_N$. The ranking is a sequence that includes the N landmark devices and the target device $\tau$ together in an order that consolidates the relative delay information captured by $S_\tau$ and $S_1, S_2, \ldots S_N$. For example, in one embodiment, suppose the target device $\tau$ is at a position $p_\tau$ in the ranking R, while landmark device $L_i$ is at position $p_i$, landmark device $L_j$ is at position $p_j$, and landmark device $L_k$ is at position $p_k$. If $(p_\tau - p_i)^2 < (p_\tau - p_j)^2$ and $(p_i, p_j < p_\tau) \cup (p_i, p_j > p_\tau)$, then $d_{i,\tau} < d_{j,\tau}$.

Once the ranking has been generated, a boundary is determined across the geographical region for each pair of devices that are in $W_{initial}$. Again, since there are N landmark devices in $W_{sub}$, there are $$\binom{N}{2} = \frac{N!}{2!(N-2)!}$$

pairs of landmark devices that are in $W_{initial}$. A boundary between a landmark device $L_i$ and a landmark device $L_j$ is denoted as $B_{i,j}$. The boundary $B_{i,j}$ divides the geographical region into a target partition $\Omega_{i,j}$ and a second partition $\omega_{i,j}$. The target partition $\Omega_{i,j}$ includes the landmark device in the pair $(L_i, L_j)$ that is closer to the target device $\tau$ (e.g., as indicated in the ranking R or in $S_\tau$), while the second partition $\omega_{i,j}$ includes the landmark device in the pair $(L_i, L_j)$ that is farther from the target device (e.g., as indicated in the ranking R or in $S_\tau$). For example, if $(p_\tau - p_i)^2 < (p_\tau - p_j)^2$ and $(p_i, p_j < p_\tau) \cup (p_i, p_j > p_\tau)$, then the target partition includes $L_i$ and the second partition includes $L_j$. Also, the target partition $\Omega_{i,j}$ can include the landmark devices in $W_{initial}$ that are closer to $L_i$ than to $L_j$ in the ranking R. The second partition can include the landmark devices in $W_{initial}$ that are closer to $L_j$ than to $L_i$ in the ranking R. In one embodiment, the boundary $B_{i,j}$ is a substantially straight line determined by applying a pie-cutting methodology to the geographical region based on where the landmark devices in $W_{initial}$ are located.

Once the boundaries have been defined, a first mutual-overlap area is determined. The first mutual-overlap area, denoted as $\alpha$, is a sector where the target partitions for all the pairs of landmark devices that are in $W_{initial}$ intersect with each other. More formally, the first mutual-overlap area $\alpha$ can be defined as:

$$\alpha = \bigcap_{i | L_i \in W_{initial}} \bigcap_{j | L_j \in W_{initial}, j \ne i} \Omega_{i,j}$$

The first mutual-overlap area encompasses the target device $\tau$ in the sense that $\tau$ is located somewhere within the first mutual overlap area.

Once the first mutual-overlap area has been determined, a subset of the landmark devices can be selected. The subset of landmark devices can be referred to as $W_{sub}$, where $W_{sub} \subseteq W_{initial}$. The landmark devices included in the subset $W_{sub}$ can be selected in several different ways. In one embodiment, $W_{sub}$ includes any landmarks in $W_{initial}$ for which at least one corresponding boundary tightly bounds one side the first mutual-overlap area $\alpha$. For example, if $\alpha \mathbf{0}$ is a triangle whose vertices are the points where $B_{i,j}$, $B_{i,k}$, and $B_{j,k}$ intersect, then $W_{sub}$ would include $L_i$, $L_j$, and $L_k$ because line segments of boundaries $B_{i,j}$, $B_{i,k}$, and $B_{j,k}$ define the sides of $\alpha$. Thus, if a vertex of $\alpha$ is located on a boundary $B_{i,j}$, both $L_i$ and $L_j$ are members of the subset $W_{sub}$.

In another embodiment, $W_{sub}$ can include the landmark devices in $W_{initial}$ that, if connected by lines on a map, would form a convex hull H that surrounds the first mutual-overlap area $\alpha$ (i.e., such that $\alpha \cap H = \alpha$). In one example, H is the smallest convex hull that can be made from landmarks in $W_{initial}$ that fully encompasses $\alpha$. Optionally, landmarks whose locations are in the interior of H can also be included in $W_{sub}$.

In another embodiment, any landmark devices in $W_{initial}$ that are located within a predefined geographical distance from $\alpha$ can be included in $W_{sub}$. Alternatively, landmark devices in $W_{initial}$ can be added to $W_{sub}$ preferentially according to their geographical distances from $\alpha$ (e.g., closest landmark devices are added first) until $W_{sub}$ includes a desired minimum number of landmark devices.

Depending on the size of the geographical area and the number of landmarks in $W_{sub}$, the first mutual-overlap area may be satisfactory. However, once the first mutual-overlap area and $W_{sub}$ have been determined, the location of $\tau$ can be identified with even finer granularity, if desired, in the following manner. First, for each landmark device $L_i$ in $W_{sub}$, an actual data-transmission path from the landmark device $L_i$ to the target device $\tau$ is determined via network tomography. Network tomography is a technology for inferring network technology using end-to-end probes. Network tomography is a relatively expensive operation which involves numerous measurements. Therefore, for the sake of efficiency, it is preferable to perform network tomography on as small an area as possible. Advantageously, the landmark devices $W_{sub}$ are relatively close to the target device; this reduces the area on which network tomography is to be performed.

Once the actual data-transmission paths have been determined, the length of each actual data-transmission path is determined. The length of each actual data-transmission path is the direct travel distance from a landmark device to $L_i$ to the target device $\tau$. The direct travel distance from to $L_i$ to $\tau$ can be referred to as $\dagger_{i,\tau}$. Once the direct travel distances have been determined, a geographical bounding circle is determined for each landmark device in $W_{sub}$. The bounding circle for a landmark device $L_i$ can be referred to as $\varphi_i$. The bounding circle $\varphi_i$ is centered at $L_i$ (i.e., centered at the geographical coordinates where $L_i$ is located) and has a radius substantially equal to $\dagger_{i,\tau}$.

Once the bounding circles have been determined, a second mutual-overlap area, referred to as β, is determined. The second mutual-overlap area is a sector where the bounding circles for all the landmark devices in $W_{sub}$ intersect with each other. More formally, the second mutual-overlap area β can be defined as:

$$\beta = \bigcap_{i|L_i \in W_{sub}} \varphi_i$$

Like the first mutual-overlap area, the second mutual-overlap area encompasses the target device τ in the sense that τ is located somewhere within the second mutual-overlap area. Typically, the second mutual-overlap area β is a sub-sector within the first mutual-overlap area α. However, if β is not completely contained within α, the target device τ can be found in the intersection area a $\alpha \cap \beta$. In either case, though, the result is that the location of the target device τ is determined with fine-grained precision.

FIG. 1 illustrates a computing environment 100 in which technology of the present disclosure can operate, according to one embodiment. As shown, the computing device 104 and the target device 108 are connected to the network 102. The target device 108 uses the Internet Protocol (IP) address 110 to communicate via the network 102, but the location (e.g., longitude and latitude coordinates) of the target device 108 is unknown. The location detector 106 is a module configured to determine where the target device 108 is located within a geographical region depicted by the map 122.

To determine where the target device 108 is, the location detector 106 selects the computing devices 118 and the mobile devices 112 to use as landmark devices. Computing devices 118 are stationary and reside at known locations (e.g., that are recorded in an online directory). GPSs 114 can readily provide the locations of mobile devices 112, respectively, thereby allowing mobile devices 112 to be used as landmarks. In general, arbitrary numbers of both types of devices may be used as landmarks. Computing devices 118 use IP addresses 120 to communicate via the network 102. Mobile devices 112 use IP addresses 116 to communicate via the network 102. Together, the computing devices 118 and the mobile devices 112 make up the set of landmark devices 124.

For each of the landmark devices 124, the location detector 106 determines a respective corresponding network-communication delay to the target device 108. Also, for each of the landmark devices 124, the location detector 106 also determines a respective network-communication delay to each other device included in the landmark devices 124. Each the network-communication delays indicates how long it takes for data packets to travel between each pair of IP addresses that can be selected out of the IP addresses 120, the IP addresses 116, and the IP address 110.

Next, the location detector 106 generates a first sequence of the landmark devices 124 based on the network-communication delays to the target device 108. Specifically, each of the landmark devices 124 is positioned in order in the first sequence according to the corresponding network-communication delay between the respective device and the target device 108.

For each of the landmark devices 124, the location detector 106 also generates a respective sequence of the other devices included in the landmark devices 124. Specifically, in a sequence for a particular device of the landmark devices 124, each other device is positioned in order according to the corresponding network-communication delay to the particular device from the other device.

Next, the location detector 106 generates, based on the generated sequences, a ranking of the landmark devices 124 relative to the target device 108. The location detector 106 identifies a plurality of pairs of the landmark devices 124. For each pair of devices, the location detector 106 determines a respective boundary across the map 122. For each pair, the generated ranking indicates a first device of the pair is closer to the target device than a second landmark device of the pair. Each boundary divides the geographical region into a target partition that includes the first device of the pair and a second partition that includes the second device of the pair.

After determining the boundaries, the location detector 106 determines a first mutual-overlap area that overlaps with the target partition of each pair. The target device 108 is located within the first mutual-overlap area.

Optionally, based on the ranking, the location detector 106 selects a subset of the landmark devices 124 to use for locating the target device 108 with finer granularity. To pinpoint the location of the target device 108, the location detector 106 can perform network tomography to determine actual data-transmission paths from the landmark devices 124 that are in the subset to the target device 108. The location detector 106 determines direct travel distances from the landmark devices 124 that are in the subset to the target device 108 based on the actual data-transmission paths (e.g., by projecting the actual data-transmission paths onto the map 122 and applying a scale of the map 122).

Once the direct travel distances have been determined, the location detector 106 determines geographical bounding circles for the landmark devices 124 that are in the subset. Each bounding circle is centered at one of the landmark devices 124 and has a radius equal to (or approximately equal to) the direct travel distance from the device at the center of the bounding circle to the target device 108.

Next, the location detector 106 determines a second mutual-overlap area in the map 122 where the determined bounding circles overlap. The target device 108 is located within the second mutual-overlap area. Typically, the first mutual-overlap area encompasses second mutual-overlap area. However, if the first mutual-overlap area only encompasses part of the second mutual overlap area, the target device 108 is located in a sector where the first mutual-overlap area and the second mutual-overlap area overlap with each other.

Figure 2:
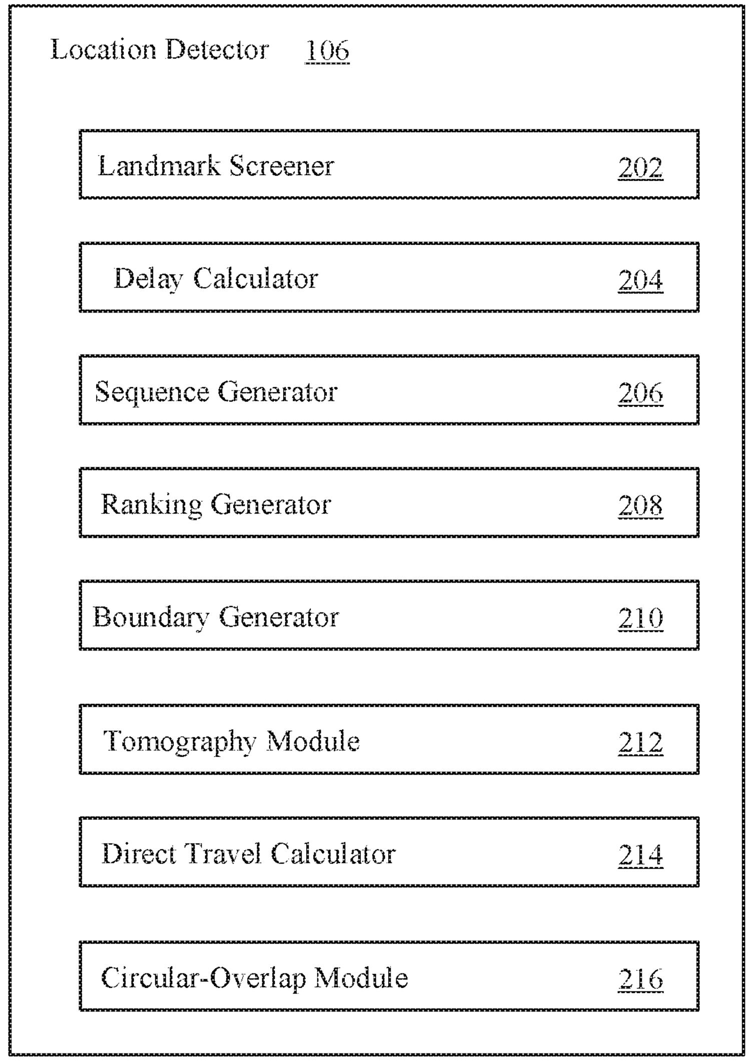
FIG. 2 illustrates a detailed view of a location detector, according to one embodiment.

FIG. 2 illustrates a detailed view of the location detector 106, according to one embodiment. As shown, the location detector 106 includes a landmark screener 202, a delay calculator 204, a sequence generator 206, a ranking generator 208, a boundary generator 210, a tomography module 212, a direct travel calculator, and a circular-overlap module 216.

To determine where a target device is located, the location detector 106 first selects a set of landmark devices. Some potential landmark devices are stationary and reside at known locations (e.g., that are recorded in an online directory). The number of potential landmarks can be greatly expanded if mobile devices with GPSs can be used. One problem, though, is that mobile devices are, by definition, mobile—and therefore may not be suitable for use as landmarks under some circumstances. However, many mobile devices are stationary for at least several hours a day.

A mobile phone, for example, may sit on a desk in an office for eight hours while a user works, move for about an hour while the user commutes home for the evening, and then sit on a nightstand for eight hours while the user sleeps. In this example, the mobile phone would make a suitable landmark for most of the day while it sits on the desk and most of the night while it sits on the nightstand. However, it would not be a suitable landmark during the commute. The landmark screener 202 identifies which mobile devices to include in the set of landmark devices to use for locating a target device based on movement patterns.

For example, once a mobile device connected to the network has been identified, the landmark screener 202 can determine a rate of movement associated with the mobile device based on measurements associated with a GPS integrated in the mobile device. The landmark screener 202 compares the rate of movement to a predefined threshold rate and determines whether to include the at least one mobile device in the set of landmark devices based on the comparison. For example, the threshold rate may define an upper bound such that the landmark screener 202 excludes any mobile device moving at a rate exceeding the threshold rate from the set of landmark devices. Also, in some embodiments, the landmark screener 202 can actively predict whether a mobile device should be used as a landmark based on historical movement data associated with the device. For example, if historical movement data suggests the mobile device typically moves at a rate exceeding the threshold between 5 pm and 6 pm, the landmark screener 202 can preemptively exclude the mobile device from the set from 5 pm and 6 pm even if the mobile device's current rate of movement is below the threshold rate.

For each landmark device in the set, the delay calculator 204 determines a respective corresponding network-communication delay (e.g., a ping delay or a round-trip time delay) to the target device (e.g., to an IP address associated with the target device). In one example, the delay calculator 204 uses reference hosts (e.g., active landmarks) to perform the actual delay measurements. For example, a reference host can contain JavaScript, Java Applet, and Flash code as web beacons on a web server in hidden inline frames on servers of a website network. In addition, the reference hosts can perform measurements for other landmark devices (e.g., passive landmarks) using traceroute and ping utilities. Similarly, for each of the landmark devices in the set, the delay calculator 204 also determines a respective network-communication delay to each other device included in the set. The network-communication delays indicate how long it takes for data packets to travel between each pair the landmark devices (e.g., the IP addresses associated with the landmark devices on the network).

Next, the sequence generator 206 generates a first sequence of the landmark devices based on the network-communication delays to the target device. Specifically, each of the landmark devices in the set are ordered in the in the first sequence according to their corresponding network-communication delays to the target device. For each of the landmark devices in the set, the sequence generator 206 also generates a respective sequence of the other devices in the set. Specifically, in a sequence for a particular landmark device, the other landmark devices are ordered according to their corresponding network-communication delays to the particular device.

Next, the ranking generator 208 generates, based on the generated sequences, a ranking of the landmark devices in the set relative to the target device. In one embodiment, the ranking generator 208 applies a maximum a posteriori (MAP) sequence-matching method to the generated sequences to generate the ranking.

The location detector 106 identifies a plurality of pairs of devices in the set (e.g., all possible pairs of landmark devices). For each pair of devices, the boundary generator 210 determines a respective boundary. The boundary divides the geographical region into a target partition and a second partition. The target partition includes the landmark device of the pair that the generated ranking (or one or more of the generated sequences) indicates is closer to the target device. The second partition includes the other landmark device of the pair. In one embodiment, boundary generator 210 determines the boundaries by applying a pie-cutting theorem or a cake-cutting theorem. After the boundaries for the pairs are determined, the location detector 106 determines a first mutual-overlap area that overlaps with the target partition of each pair. The target device is located within the first mutual-overlap area.

Optionally, based on the ranking, the location detector 106 determines subset of the landmark devices to use for locating the target device. To pinpoint the location of the target device with finer granularity, the tomography module 212 can perform network tomography to determine actual data-transmission paths from the landmark devices in the subset to the target device. The direct travel calculator 214 determines direct travel distances from the landmark devices in the subset to the target device based on the actual data-transmission paths.

Once the direct travel distances have been determined, the circular-overlap module 216 determines geographical bounding circles for the landmark devices in the subset. Each bounding circle is centered at one of the landmark devices and has a radius equal to (or approximately equal to) the direct travel distance from the device at the center of the bounding circle to the target device. Next, the circular-overlap module 216 determines a second mutual-overlap area where the determined bounding circles overlap. The target device is located within the second mutual-overlap area.

Figure 3:
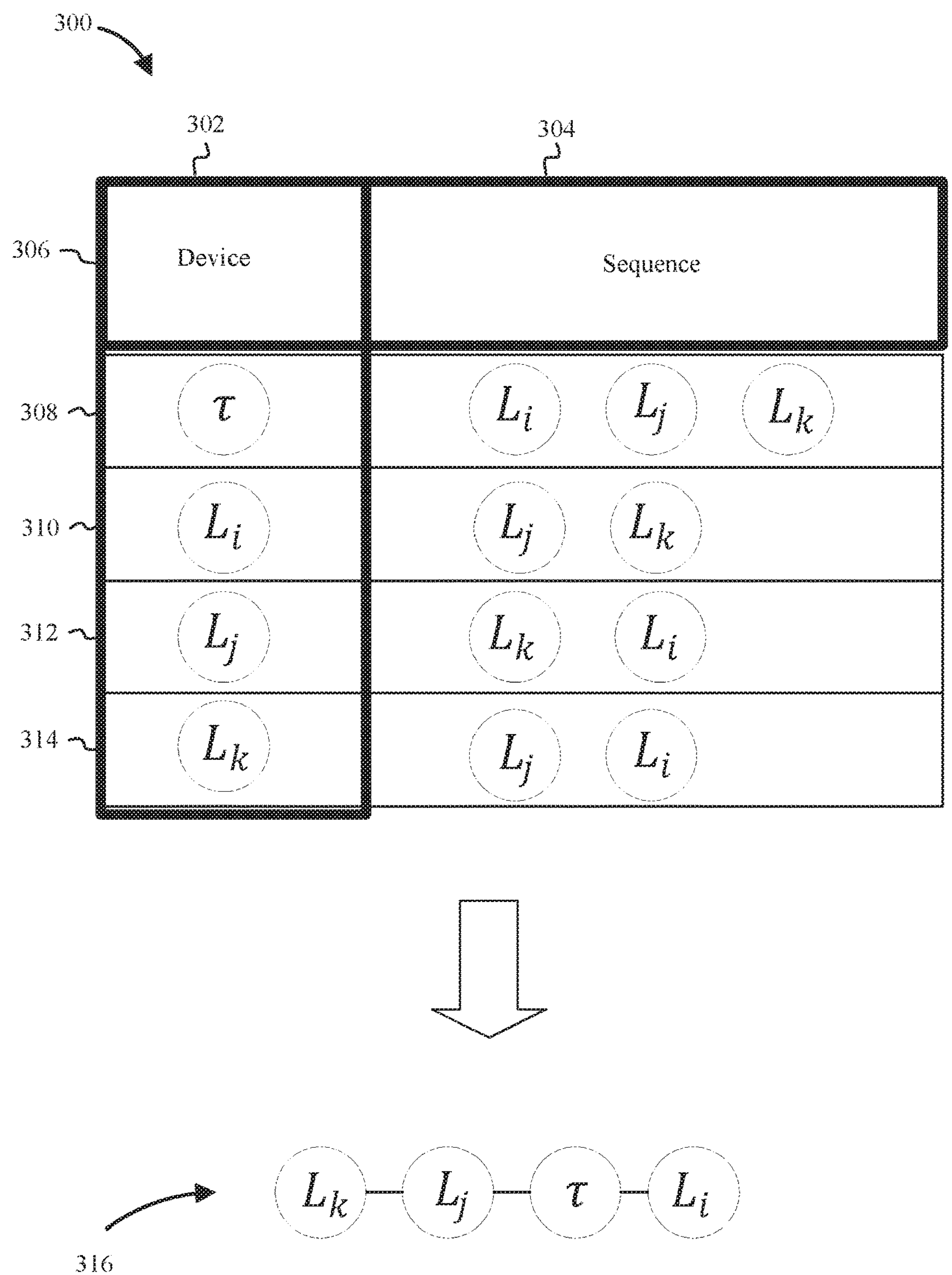
FIG. 3 illustrates an example table of sequences that can be used to determine a ranking, according to one embodiment.

FIG. 3 illustrates an example table 300 of sequences that can be used to determine a ranking 316, according to one embodiment. Header row 306 identifies the contents of columns 302 and 304, while header column 302 identifies the devices to which each sequence corresponds. $L_i$, $L_j$, and $L_k$ refer to landmark devices and $\tau$ refers to a target device whose location is to be determined. The cell at row 308, column 304 is a sequence $S_\tau$ in which the landmark devices $L_i$, $L_j$, and $L_k$ are sorted in monotonic non-decreasing order from left to right based on to how long it takes for data to travel over a network between each respective landmark and the target device. Thus, the network-communication delay between $L_i$ and $\tau$ is less than or equal to the network-communication delay between $L_i$ and $\tau$ and $\tau$ (i.e., $d_{i,\tau} \le d_{j,\tau}$). Similarly, since $L_k$ is positioned to the right of $L_j$ in the sequence $S_\tau$ as shown, the network-communication delay between $L_k$ and $\tau$ is less than or equal to the network-communication delay between $L_j$ and $\tau$ (i.e., $d_{j,\tau} \le d_{k,\tau}$).

The cell at row 310, column 304 is a sequence $S_i$ in which the landmark devices $L_j$ and $L_k$ are sorted in monotonic non-decreasing order from left to right based the respective network communication delays to landmark device $L_i$. Thus, the network-communication delay between $L_i$ and $L_j$ is less than or equal to the network-communication delay between $L_i$ and $L_k$ (i.e., $d_{i,j} \le d_{i,k}$).

The cell at row 312, column 304 is a sequence $S_j$ in which the landmark devices $L_i$ and $L_k$ are sorted in monotonic non-decreasing order from left to right based the respective network communication delays to landmark device $L_j$. Thus, the network-communication delay between j and $L_k$ is less than or equal to the network-communication delay between $L_i$ and $L_j$ (i.e., $d_{j,k} \le d_{i,k}$).

The cell at row 314, column 304 is a sequence $S_k$ in which the landmark devices $L_j$ and $L_i$ are sorted in monotonic non-decreasing order from left to right based the respective network communication delays to landmark device $L_k$. Thus, the network-communication delay between $L_j$ and $L_j$ is less than or equal to the network-communication delay between $L_i$ and $L_k$ (i.e., $d_{j,k} \le d_{i,k}$).

Thus, sequences $S_\tau$, $S_i$, $S_j$, and $S_k$ capture information about how large the network-communication delays are relative to each other. The ranking 316 can be determined by applying a sequence-matching methodology to $S_\tau$, $S_i$, $S_j$, and $S_k$. The ranking 316 captures some of the information found in $S_\tau$, $S_i$, $S_j$, and $S_k$ into a single sequence that can be used to determine a subset of landmark devices to use for locating the target device. For example, target device τ is at the third position from the left in the ranking 316 (i.e., $p_\tau=3$). Landmark device $L_k$ is at the first position from the left, landmark device $L_j$ is in the second position from the left, and landmark device $L_i$ is in the fourth position from the left in the ranking 316 (i.e., $p_k=1$, $p_j=2$, and $p_i=4$). In this example, since $(p_j-p_\tau)^2=(2-3)^2=1$ and $(p_k-p_\tau)^2=(1-3)^2=4$, it can be inferred from the ranking 316 that there is a smaller network-communication delay between $L_j$ and τ than between $L_k$ and τ. Similarly, the ranking 316 shows that there is a smaller network-communication delay between i and τ than between $L_k$ and τ. Thus, $L_i$ and $L_j$ would be preferable to include in the subset of landmark devices over $L_k$. However, in some examples, all devices in the ranking may be included in the subset (e.g., if the minimum number of landmark devices to include in $W_{sub}$ equals the number of landmark devices in the ranking 316).

Figure 4:
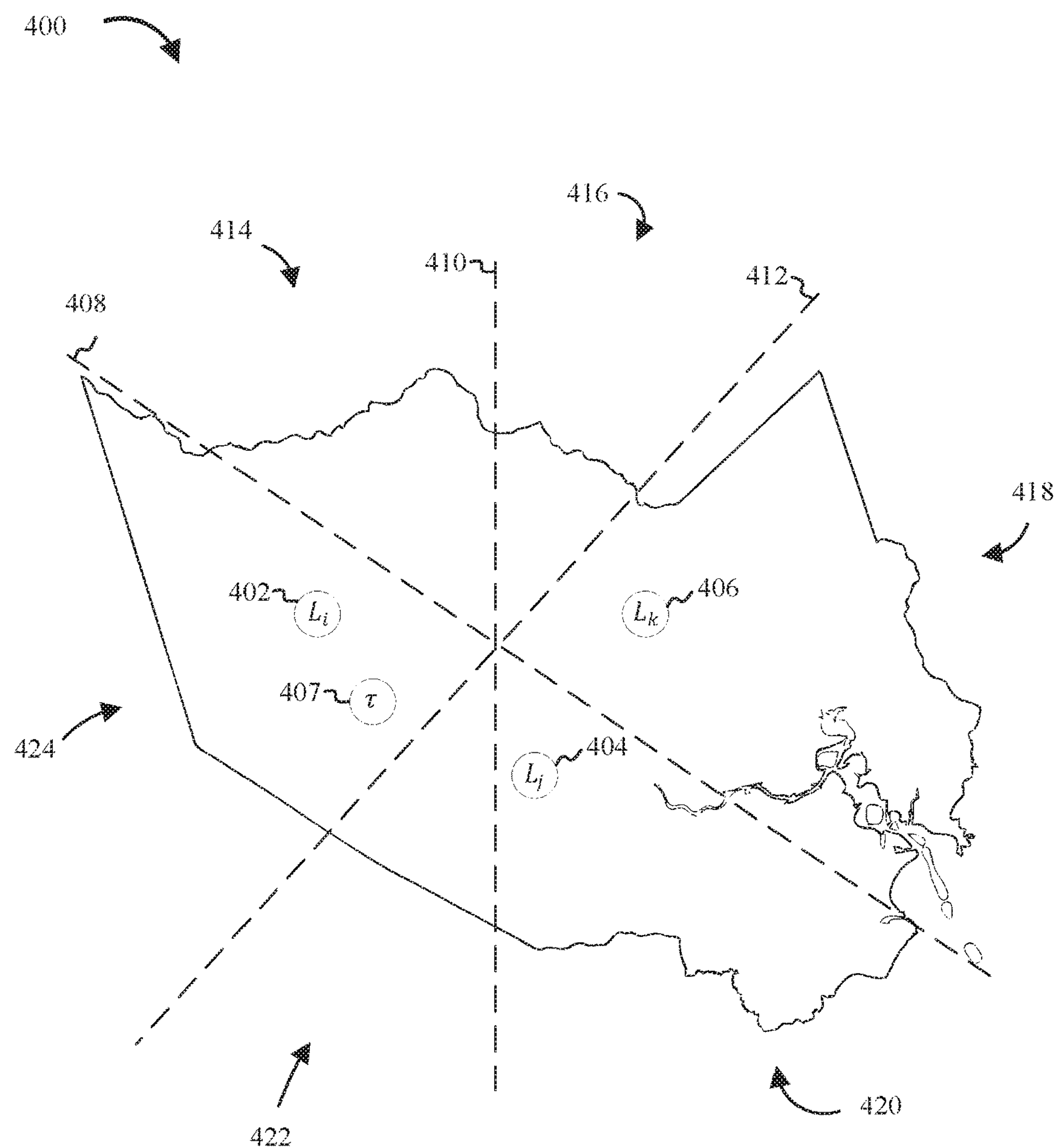
FIG. 4 illustrates an example geographical region in which boundaries between landmark devices can be determined, according to one embodiment.

FIG. 4 illustrates an example geographical region 400 in which boundaries between landmark devices can be determined, according to one embodiment. Suppose that a set of landmark devices $W_{initial}$ to use for locating a target device τ includes landmark devices $L_i$, $L_j$, and $L_k$. Also suppose icon 402 represents landmark device $L_i$, icon 407 represents target device τ, icon 404 represents landmark device $L_j$, and icon 406 represents landmark device $L_k$.

In order to determine where τ is located, the following approach can be used. First, for every pair of devices in $W_{initial}$, a respective boundary is determined. Since there are three landmark devices in $W_{initial}$, there are three possible pairs: ($L_i$, $L_j$), ($L_i$, $L_k$), and ($L_j$, $L_k$). Each boundary divides the geographical region into a target partition and a second partition. The target partition includes the landmark device of the corresponding pair that is closer to the target device in the ranking, while the second partition includes the landmark device of the corresponding pair that is farther from the target device in the applicable ranking.

For example, if the ranking 316 and the table 300 (from FIG. 3) are applicable, boundary 412 (i.e., $B_{i,j}$) corresponds to the pair ($L_i$, $L_j$). The target partition $\Omega_{i,j}$ demarcated by $B_{i,j}$ includes the portion of geographical region 400 that lies to the left of boundary 412, which includes $L_i$ and wedges 416, 414, and 424. The second partition $\omega_{i,j}$ demarcated by $B_{i,j}$ includes the portion of geographical region 400 that lies to the right of boundary 412, which includes $L_j$ and wedges 418, 420, and 422. As shown, τ lies in the target partition $\Omega_{i,j}$.

Boundary 410 (i.e., $B_{i,k}$) corresponds to the pair ($L_i$, $L_k$). The target partition $\Omega_{i,k}$ demarcated by $B_{i,k}$ includes the portion of geographical region 400 that lies to the left of boundary 410, which includes $L_i$ and wedges 414, 424, and 422. The second partition $\omega_{i,k}$ demarcated by $B_{i,k}$ includes the portion of geographical region 400 that lies to the right of boundary 410, which includes $L_k$ and wedges 416, 418, and 420. As shown, τ lies in the target partition $\Omega_{i,k}$.

Boundary 408 (i.e., $B_{j,k}$) corresponds to the pair ($L_j$, $L_k$). The target partition $\Omega_{j,k}$ demarcated by $B_{j,k}$ includes the portion of geographical region 400 that lies to the left of boundary 408, which includes $L_j$ and wedges 420, 422, and 424. The second partition $\omega_{j,k}$ demarcated by $B_{j,k}$ includes the portion of geographical region 400 that lies to the right of boundary 408, which includes $L_k$ and wedges 414, 416, and 418. As shown, τ lies in the target partition $\Omega_{j,k}$.

A pie-slicing approach can be used to determine the boundaries 408, 410, and 412 so that each boundary is a line (e.g., a maximum-margin line or hyperplane) that separates the two devices of a pair. However, more complicated boundaries are also possible if other approaches are used.

After the boundaries 408, 410, and 412 have been determined, the location of τ can be narrowed down to a first mutual-overlap area a where the target partitions $\Omega_{i,j}$, $\Omega_{i,k}$, and $\Omega_{j,k}$ overlap. In this example, the first mutual-overlap area α is the wedge 424, since it is the only portion of geographical region 400 that is included in all of the target partitions $\Omega_{i,j}$, $\Omega_{i,k}$, and $\Omega_{j,k}$.

Figure 5A:
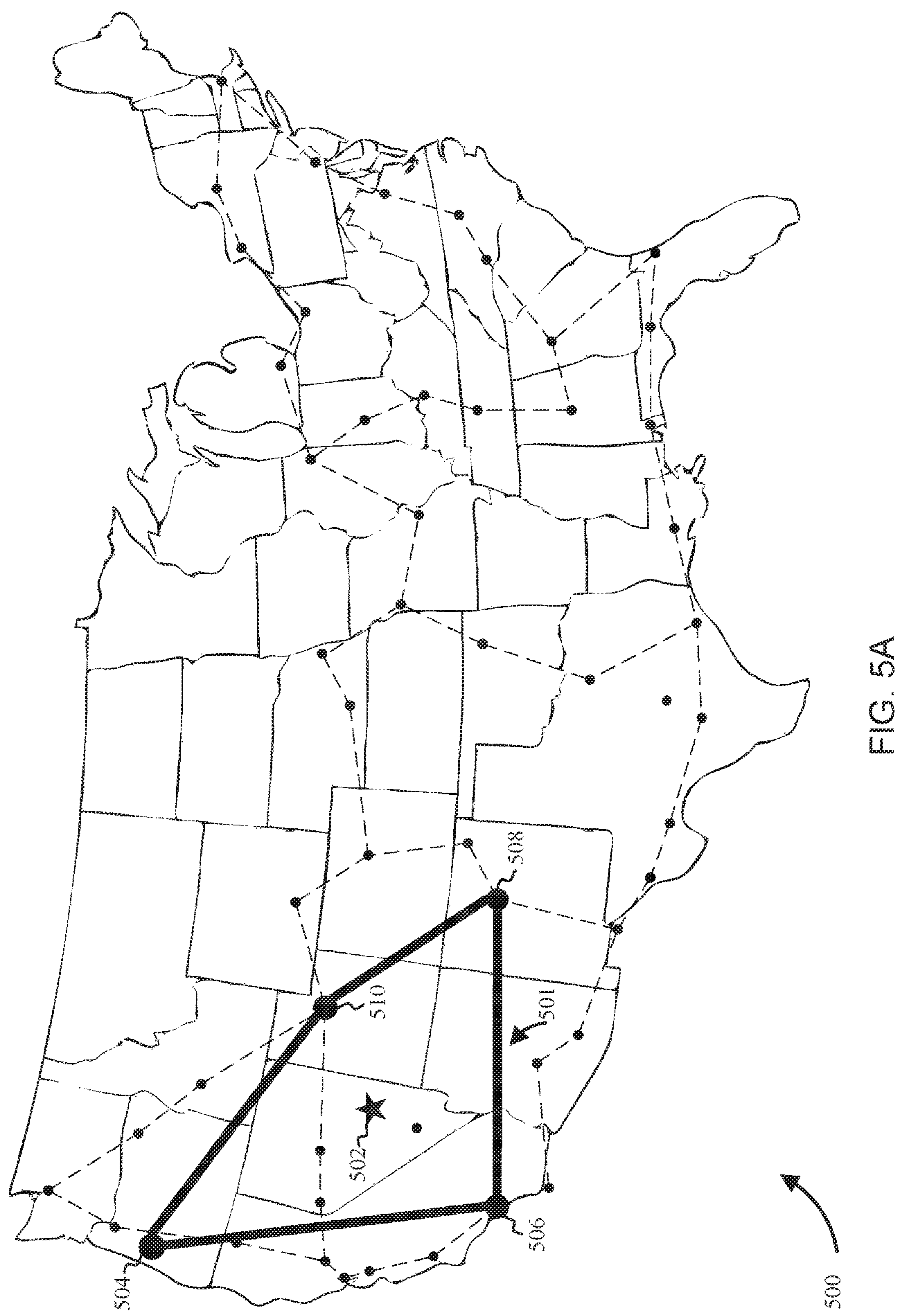
FIG. 5A illustrates an example geographical region in which technology of the present disclosure can be applied to locate a device associated with an IP address, according to one embodiment.

FIG. 5A illustrates an example geographical region 500 in which technology of the present disclosure can be applied to locate a device associated with an IP address, according to one embodiment. A target device 502 uses an IP address to communicate over the Internet. However, the location of target device 502 is unknown. A location detector can include landmark devices 504, landmark device 506, landmark device 508, and landmark device 510 in a subset of landmark devices whose geographical locations are close to the location of the target device. As shown, the target device 502 is encompassed by the convex hull 501 that connects landmark devices 504, 506, 508, and 510. Once the subset has been determined, the location detector can apply network tomography to determine respective actual data-transmission paths from the landmark devices 504-520 target device 502.

Figure 5B:
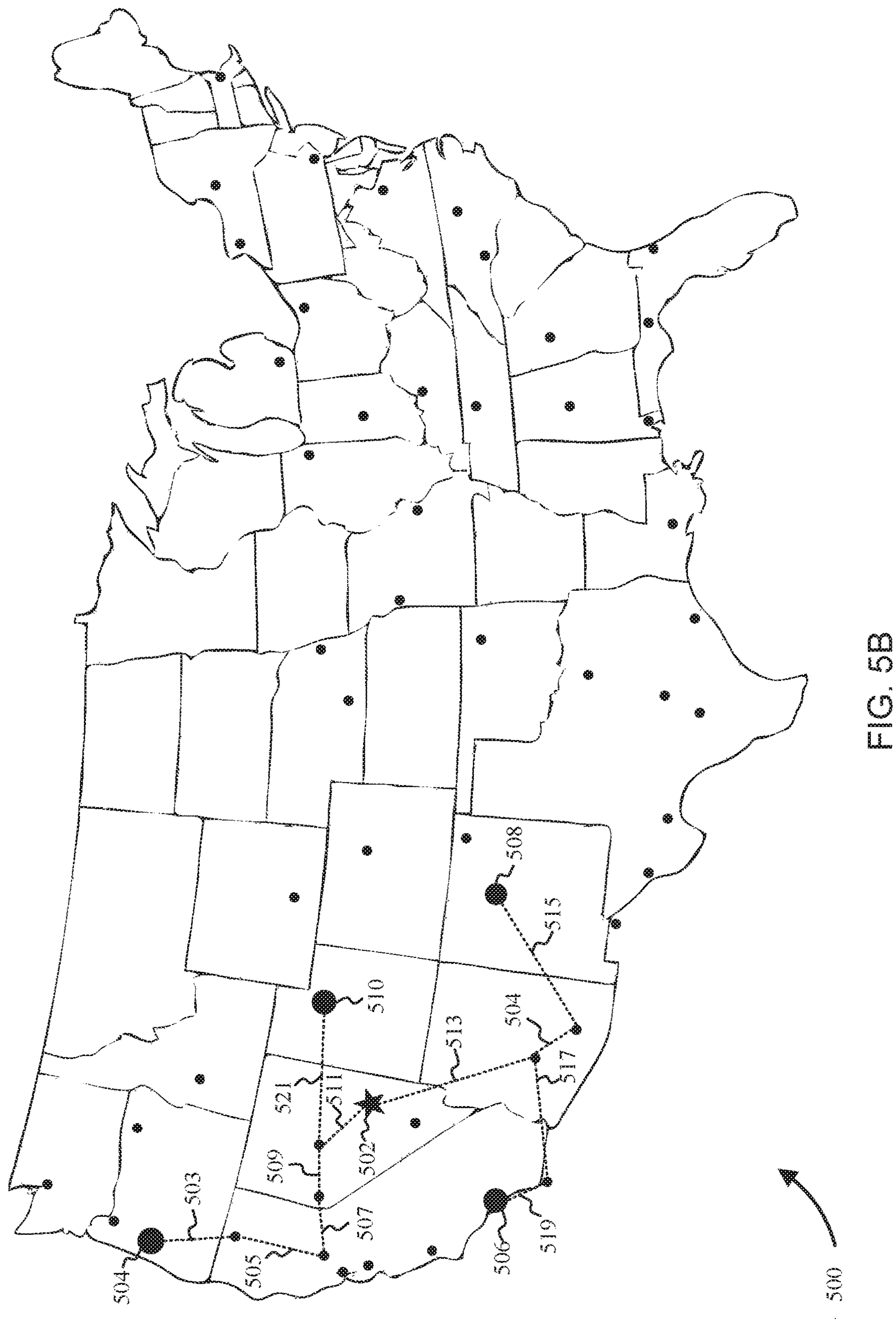
FIG. 5B illustrates example data transmission paths between landmark devices and a target device, according to one embodiment.

FIG. 5B illustrates example data transmission paths between the landmark devices 504-520 and the target device 502, according to one embodiment. The data transmission paths are determined via network tomography. As shown, data sent from the landmark device 508 to the target device 502 travels along an actual data-transmission path that includes sub-path 515, sub-path 504, and sub-path 513. Thus, the direct travel distance between the landmark device 508 and the target device 502 (i.e., $\dagger_{508,502}$) is the sum of the distances of sub-paths 515, 504, and 513. Similarly, the direct travel distance between the landmark device 506 and the target device 502 (i.e., $\dagger_{506,502}$) is the sum of the distances of sub-paths 519, 517, and 513. Also, the direct travel distance between the landmark device 504 and the target device 502 (i.e., $\dagger_{504,502}$) is the sum of the distances of sub-paths 503, 505, 507, 509, and 511. The direct travel distance between the landmark device 510 and the target device 502 (i.e., $\dagger_{510,502}$) is the sum of the distances of sub-path 521 and sub-path 511. Once the direct travel distances have been determined, the location detector can determine a geographical bounding circle for each of the landmark devices.

Figure 5C:
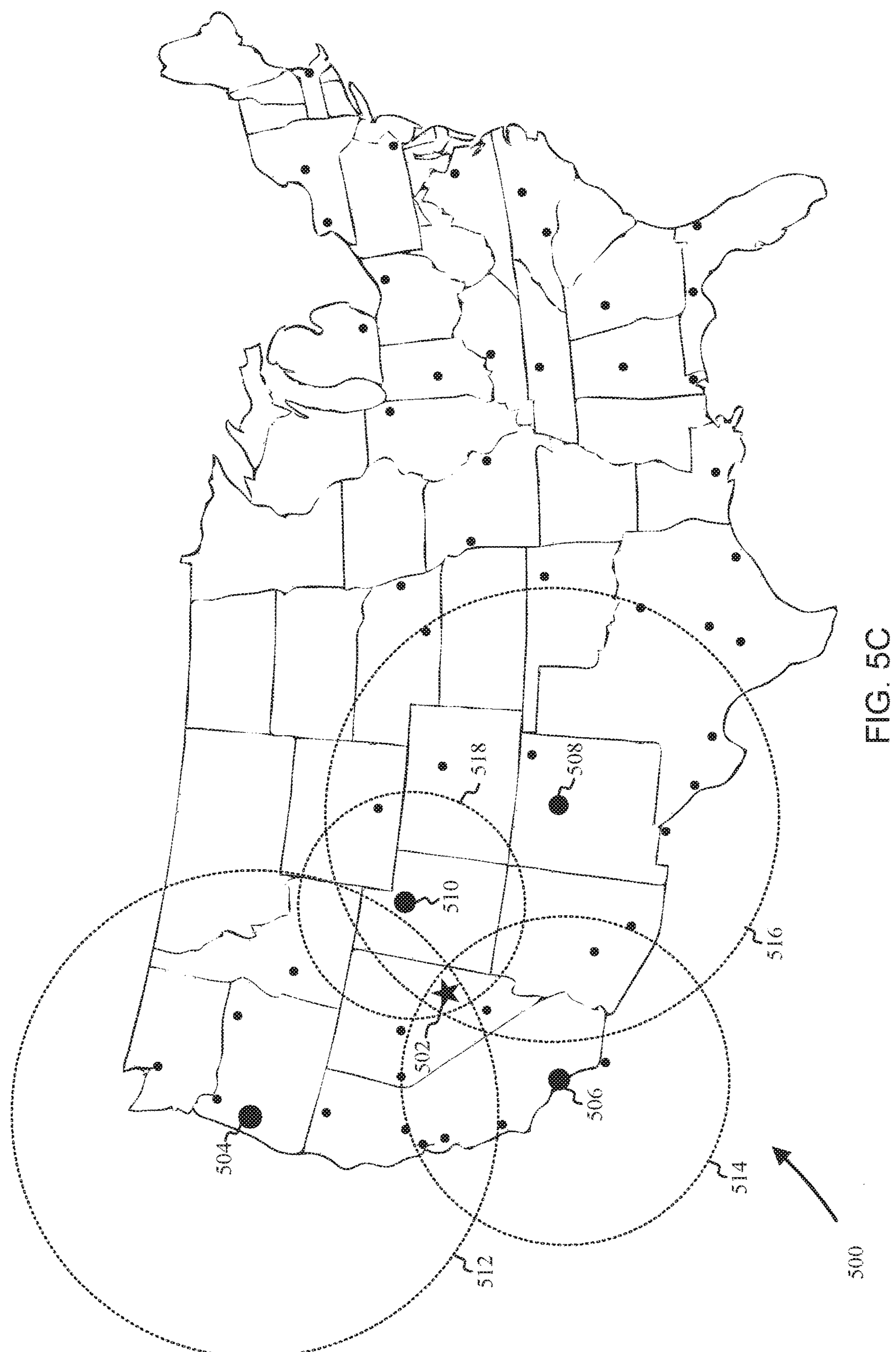
FIG. 5C illustrates example geographical bounding circles for landmark devices, according to one embodiment.

FIG. 5C illustrates example geographical bounding circles for the landmark devices 504-520, according to one embodiment. As shown, the bounding circle 516 is centered at landmark device 508. The bounding circle 516 has a radius approximately equal to the direct travel distance between the landmark device 508 and the target device 502. Similarly, bounding circle 514 is centered at landmark device 506 and has a radius approximately equal to the direct travel distance between landmark device 506 and the target device 502. Bounding circle 512 is centered at landmark device 504 and has a radius approximately equal to the direct travel distance between landmark device 504 and the target device 502. Bounding circle 518 is centered at landmark device 510 and has a radius approximately equal to the direct travel distance between landmark device 510 and the target device 502. The location detector can determines that the target device 502 is located within the area where bounding circles 512, 514, 516, and 518 all intersect with one another (i.e., a second mutual-overlap area).

Figure 6:
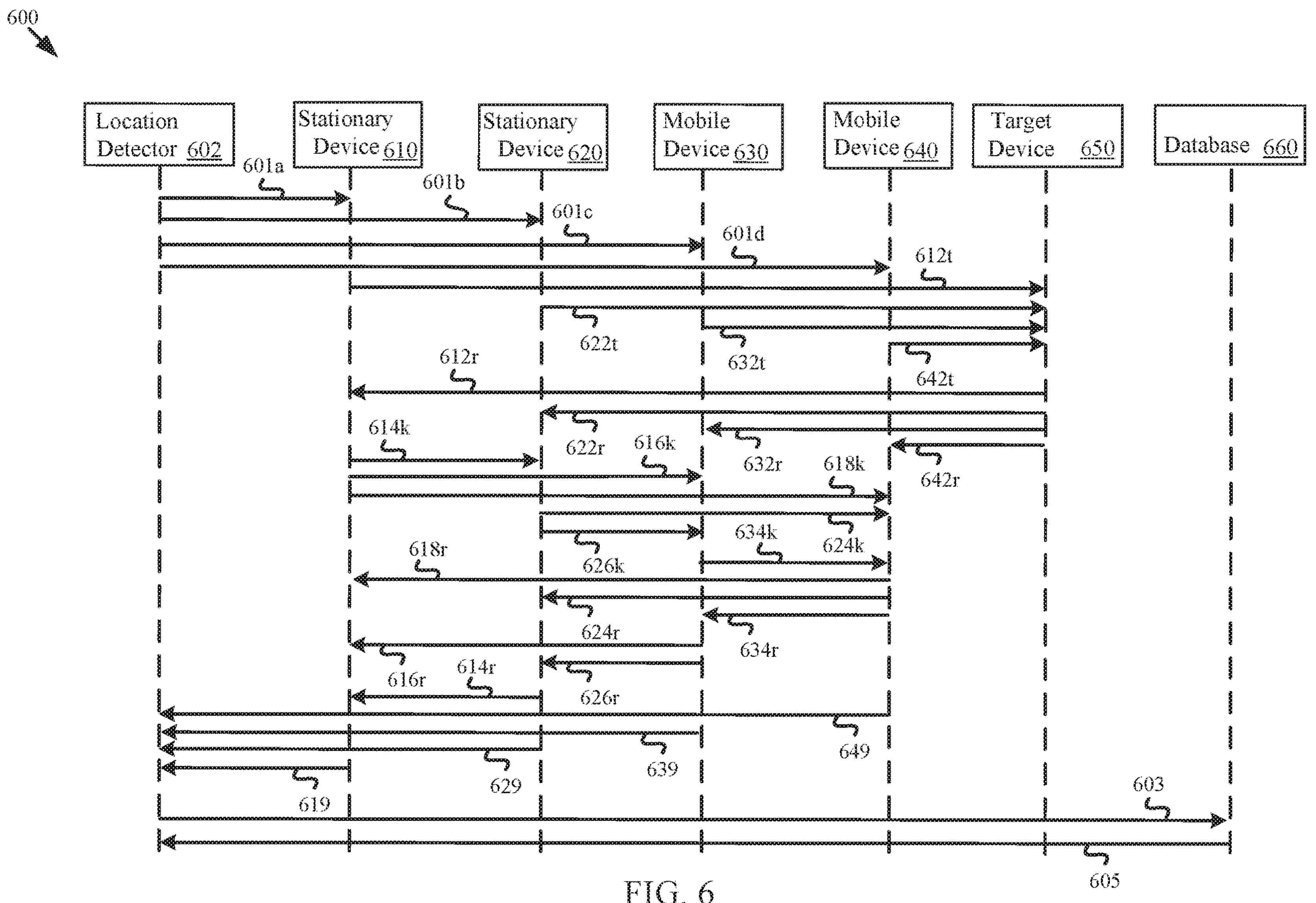
FIG. 6 illustrates an example signal flow used to determine network-communication delays and geographical locations of landmark devices, according to one embodiment.

FIG. 6 illustrates an example signal flow 600 used to determine network-communication delays and geographical locations of landmark devices, according to one embodiment. In this example, four landmark devices are shown: stationary device 610, stationary device 620, mobile device 630, and mobile device 640. However, in other examples, arbitrary numbers of both types of landmark devices can be used.

At arrow 601*a*, a location detector 602 sends an electronic message from a local network interface unit (NIU) (e.g., a network interface card (NIC)) to a remote NIU at the stationary device 610 via a transmission-control-protocol/Internet-protocol (TCP/IP) network. The electronic message signals the stationary device 610 (e.g., the remote NIU at stationary device 610) to send Internet message control protocol (ICMP) echo-request packets over the TCP/IP network to an IP address associated with the target device 650 and to IP addresses associated with the stationary device 620, the mobile device 630, and the mobile device 630. Furthermore, the electronic message signals the stationary device 610 to measure network-communication delays indicating how long it takes to receive corresponding responses to the ICMP echo-request packets over the TCP/IP network and to send back a response with the measurements.

Similarly, at arrow 601*b*, the location detector 602 sends an electronic message from a local NIU to a remote NIU at the stationary device 620 via the TCP/IP network. The electronic message signals the stationary device 620 to send ICMP echo-request packets over the TCP/IP network to the IP address associated with the target device 650 and to the IP addresses associated with the mobile device 630 and the mobile device 640. (Since stationary device 610 was already instructed to send an ICMP echo-request packet to stationary device 620, it is unnecessary for stationary device 620 to send an ICMP echo request packet to stationary device 610.) Furthermore, the electronic message signals the stationary device 620 to measure network-communication delays indicating how long it takes to receive corresponding responses to the ICMP echo-request packets over the TCP/IP network and to send back a response with the measurements.

In addition, at arrow 601*c*, the location detector 602 sends an electronic message from a local NIU to a remote NIU at the mobile device 630 via the TCP/IP network. The electronic message signals the mobile device 630 to send ICMP echo-request packets over the TCP/IP network to the IP address associated with the target device 650 and to the IP address associated with the mobile device 630. (Since stationary devices 610, 620 were already instructed to send an ICMP echo-request packet to mobile device 630, it is unnecessary for mobile device 630 to send ICMP echo-request packets to stationary devices 610, 620.) Furthermore, the electronic message signals the mobile device 630 to measure network-communication delays indicating how long it takes to receive corresponding responses to the ICMP echo-request packets over the TCP/IP network and to send back a response with the measurements. Also, since mobile device 630 is mobile, the electronic message also instructs mobile device 630 to measure location coordinates of the mobile device 630 via a GPS at the mobile device and to include the location coordinates in the response.

In addition, at arrow 601*d*, the location detector 602 sends an electronic message from a local NIU to a remote NIU at the mobile device 640 via the TCP/IP network. The electronic message signals the mobile device 640 to send an ICMP echo-request packet over the TCP/IP network to the IP address associated with the target device. (Since stationary devices 610, 620 and mobile device 630 were already instructed to send an ICMP-echo request packet to mobile device 630, it is unnecessary for mobile device 630 to send ICMP echo-request packets to stationary devices 610, 620 and mobile device 630.) Furthermore, the electronic message signals the mobile device 640 to measure network-communication delays indicating how long it takes to receive a corresponding response to the ICMP echo-request packet from the target device 650 over the TCP/IP network and to send back a response with the measurements. Also, since mobile device 640 is mobile, the electronic message also instructs mobile device 640 to measure location coordinates of the mobile device 640 via a GPS at the mobile device and to include the location coordinates in the response.

At arrow 612*t*, the stationary device 610 sends an ICMP echo-request packet to the target device 650. Similarly, at arrow 622*t*, the stationary device 620 sends an ICMP echo-request packet to the target device 650. In addition, at arrow 632*t*, the mobile device 630 sends an ICMP echo-request packet to the target device 650. At arrow 642*t*, the mobile device 640 sends an ICMP echo-request packet to the target device 650.

At arrow 612*r*, the target device 650 responds to the ICMP echo-request packet that was sent at arrow 612*t* via the TCP/IP network. The stationary device 610 receives the response and calculates a difference between a timestamp for when the ICMP echo-request packet was sent at arrow 612*r* and when the response was received at arrow 612*t*. The difference quantifies a network-communication delay between the stationary device 610 and the target device 650.

Similarly, at arrows 622*r*, 632*r*, and 642*r*, the target device 650 responds to the echo-request packets that were sent at arrows 622*t*, 632*t*, and 642*t*, respectively, via the TCP/IP network. The stationary device 620, the mobile device 630, and the mobile device 640 determine their respective network-communication delays to the target device 650 in the same manner as stationary device 610.

At arrows 614*k*, 616*k*, and 618*k*, the stationary device 610 sends ICMP echo-request packets to the stationary device 620, the mobile device 630, and the mobile device 640, respectively. At arrows 626*k* and 624*k*, the stationary device 620 sends ICMP echo-request packets to the mobile device 630 and the mobile device 640, respectively. At arrow 634*k*, the mobile device 630 sends an ICMP echo-request packet to the mobile device 640.

At arrows 618*r*, 624*r*, and 634*r*, the mobile device 640 responds to the ICMP echo-request packets that were sent at arrows 618*k*, 624*k*, and 634*k*, respectively, via the TCP/IP network. The stationary device 610, the stationary device 620, and the mobile device 630 determine their respective network-communication delays to the mobile device 640.

At arrows 616*r* and 626*r*, the mobile device 630 responds to the ICMP echo-request packets that were sent at arrows 616*k* and 626*k*, respectively, via the TCP/IP network. The stationary device 610 and the stationary device 620 determine their respective network-communication delays to the mobile device 630.

At arrow 614*r*, the stationary device 620 responds to the ICMP echo-request packet that was sent at arrow 614*k* via the TCP/IP network. The stationary device 610 determines the network-communication delay between itself (stationary device 610) and stationary device 620.

At arrow 649, the mobile device 640 sends an electronic response via the TCP/IP network to the location detector 602 in response to the electronic message at arrow 601*d* indicating the network communication delay between the mobile device 640 and the target device 650. The electronic response also includes the requested GPS coordinates of the mobile device 640.

At arrow 639, the mobile device 630 sends an electronic response via the TCP/IP network to the location detector 602 in response to the electronic message at arrow 601*c*. The electronic response indicates the network-communication delay between mobile device 630 and the target device 650 and the network-communication delay between the mobile device 630 and the target device 650. The electronic response also includes the requested GPS coordinates of the mobile device 630.

At arrow 629, the stationary device 620 sends an electronic response via the TCP/IP network to the location detector 602 in response to the electronic message at arrow 601*b*. The electronic response indicates the network-communication delays between the stationary device 620 and the mobile device 630, the stationary device 620 and the mobile device 630, and the stationary device 620 and the target device 650, respectively.

At arrow 619, the stationary device 610 sends an electronic response via the TCP/IP network to the location detector 602 in response to the electronic message at arrow 601*a*. The electronic response indicates the network-communication delays between the stationary device 610 and the stationary device 620, the stationary device 610 and the mobile device 630, the stationary device 610 and the mobile device 630, and the stationary device 610 and the target device 650, respectively.

The database 660 that maps IP addresses to locations. At arrow 603, the location detector 602 sends an electronic message via the TCP/IP network requesting location data associated with the IP addresses of the stationary device 610 and the stationary device 620, respectively. At arrow 605, the database sends an electronic response indication the location data (e.g., coordinates) associated with the specified IP addresses.

Those of skill in the art will recognize that signal flow 600 is only one example of how the location detector 602 can gather information for determining the location of the target device 650. The order of many of the signals illustrated by the arrows can be flexible and some of the signals described can be omitted, consolidated, or replicated without departing from the spirit and scope of the disclosure.

Figure 7:
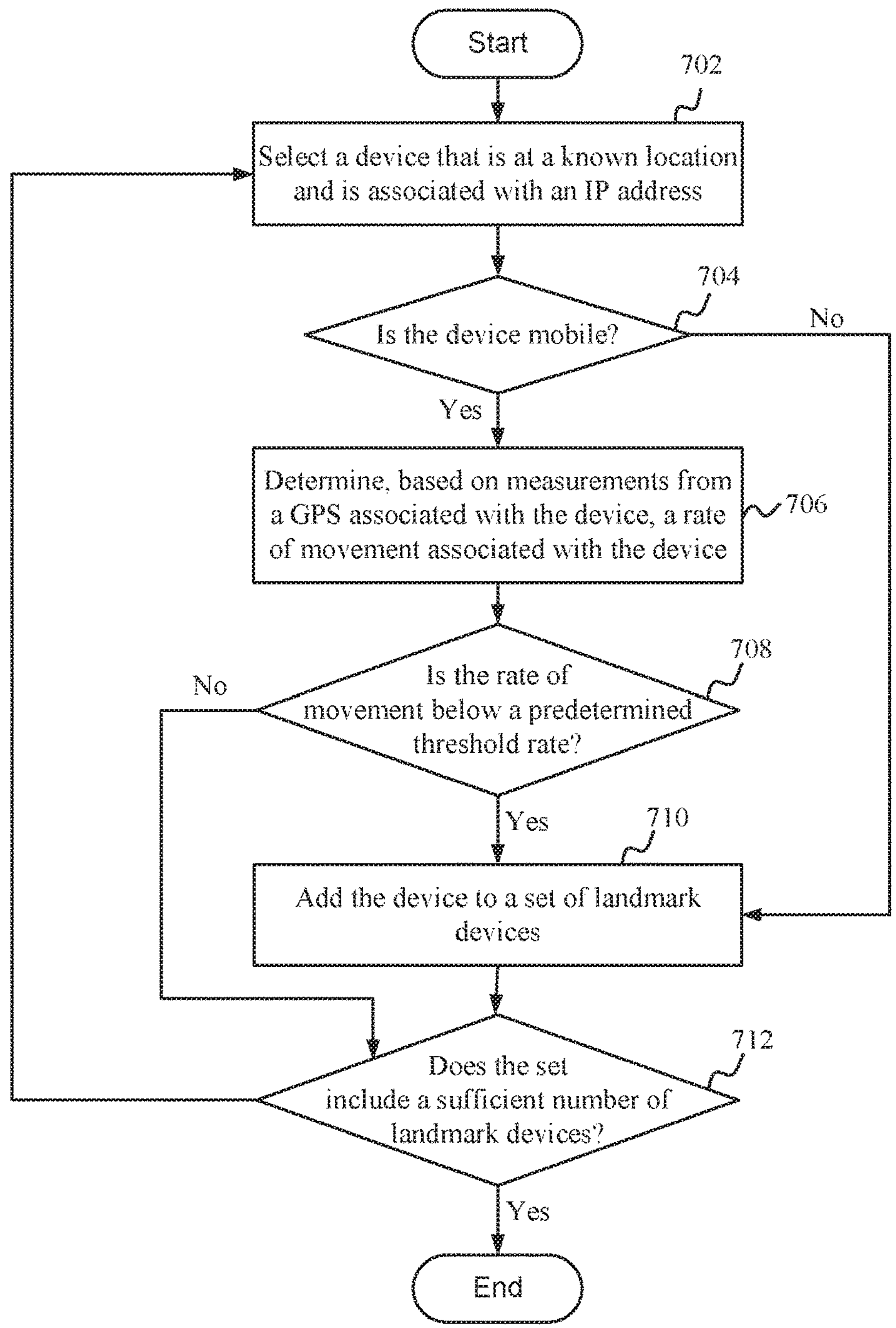
FIG. 7 illustrates functionality for identifying a set of landmark devices, according to one embodiment.

FIG. 7 illustrates functionality 700 for identifying a set of landmark devices, according to one embodiment. The functionality 700 can be implemented as a method or the functionality 700 can be executed as instructions on a machine (e.g., by one or more processors), where the instructions are included on at least one non-transitory computer-readable storage medium.

As in block 702, one action of the functionality 700 can be selecting a device that is at a known location and is associated with an IP address. As in block 704, another action of the functionality 700 can be determining whether the selected device is mobile. If the selected device is not mobile, the flow of functionality 700 proceeds to block 710. Otherwise, the flow of functionality 700 proceeds to block 706.

As in block 706, another action of the functionality 700 can be determining a rate of movement associated with the device based on measurements from a GPS associated with the device. For example, if the device includes a GPS, the GPS can provide coordinates of where the device is located at regular time intervals. The rate of change of the coordinates over several time intervals indicates the rate of movement of the device.

As in block 708, another action of the functionality 700 can be comparing the rate of movement of the device to a predetermined threshold rate. If the rate of movement exceeds the threshold rate, the device is excluded from use as a landmark and the flow of functionality 700 proceeds to block 712. On the other hand, if the rate of movement does not exceed the threshold rate, the flow of functionality 700 proceeds to block 710. As in block 710, another action of the functionality 700 can be adding the selected device to a set of landmark devices.

As in block 712, another action of the functionality 700 can be determining whether the set of landmark devices includes a sufficient number of landmark devices to locate a target device with a predefined level of precision. If not, the flow of functionality 700 proceeds to block 702. Otherwise, the flow of functionality 700 terminates.

Figure 8:
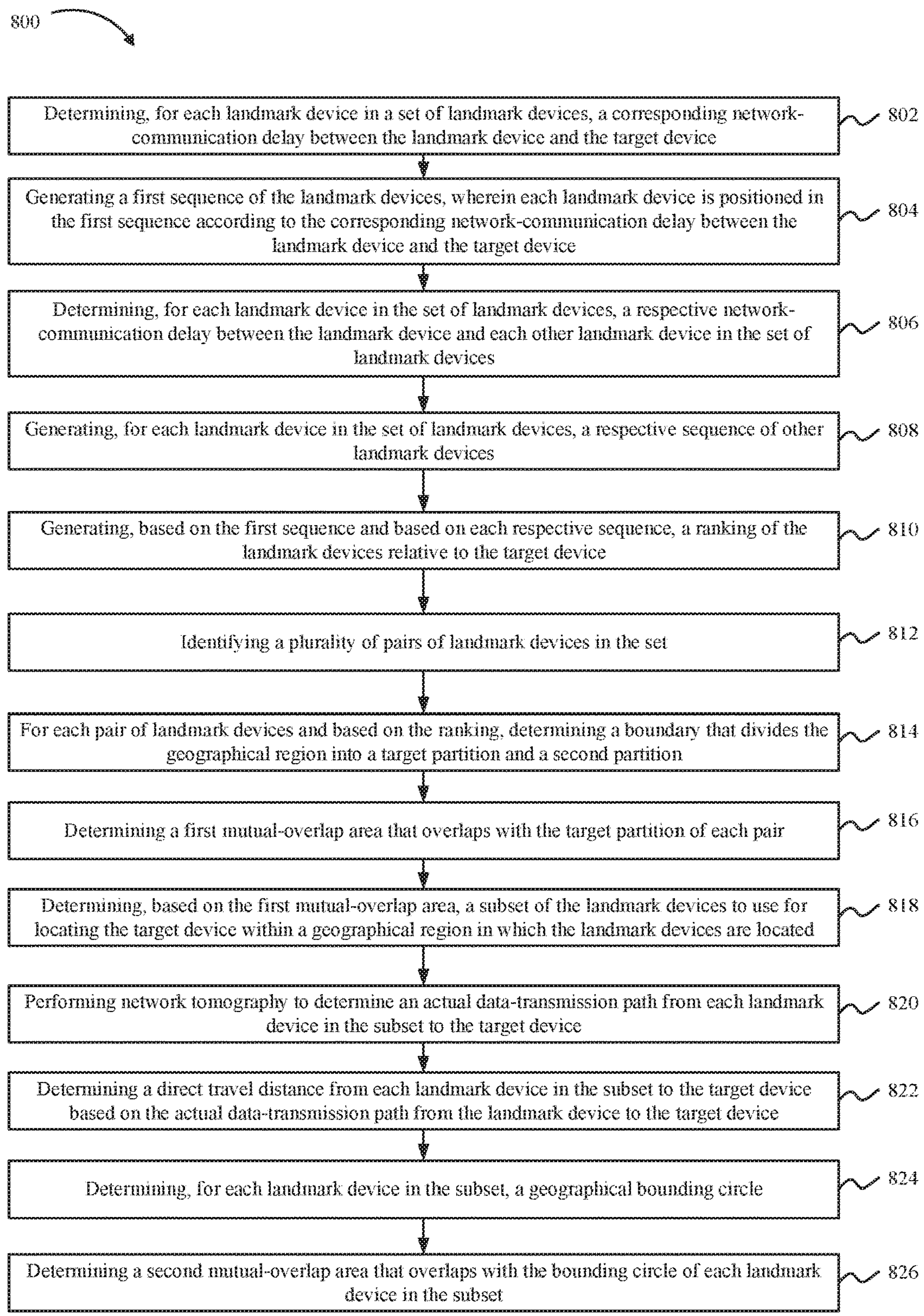
FIG. 8 illustrates functionality for determining a geographical location of a target device associated with a network address used for communicating within a network, according to one embodiment.

FIG. 8 illustrates functionality 800 for determining a geographical location of a target device associated with a network address used for communicating within a network, according to one embodiment. The functionality 800 can be implemented as a method or the functionality 800 can be executed as instructions on a machine (e.g., by one or more processors), where the instructions are included on at least one non-transitory computer-readable storage medium.

As in block 802, one action of the functionality 800 can be determining, for each landmark device in a set of landmark devices, a corresponding network-communication delay between the landmark device and the target device.

As in block 804, another action of the functionality 800 can be generating a first sequence of the landmark devices, wherein each landmark device is positioned in the first sequence according to the corresponding network-communication delay between the landmark device and the target device.

As in block 806, another action of the functionality 800 can be determining, for each landmark device in the set of landmark devices, a respective network-communication delay between the landmark device and each other landmark device in the set of landmark devices.

As in block 808, another action of the functionality 800 can be generating, for each landmark device in the set of landmark devices, a respective sequence of other landmark devices, wherein each other landmark device is positioned in the respective sequence according to the respective network-communication delay between the landmark device and the other landmark device.

As in block 810, another action of the functionality 800 can be generating, based on the first sequence and based on each respective sequence, a ranking of the landmark devices relative to the target device.

As in block 812, another action of the functionality 800 can be identifying a plurality of pairs of landmark devices in the set.

As in block 814, another action of the functionality 800 can be, for each pair of landmark devices and based on the ranking, determining a boundary that divides the geographical region into a target partition and a second partition, wherein the target partition includes a first landmark device of the pair and the second partition includes a second landmark device of the pair, and wherein the ranking indicates the first landmark device is closer to the target device than the second landmark device.

As in block 816, another action of the functionality 800 can be determining a first mutual-overlap area that overlaps with the target partition of each pair, wherein the first mutual-overlap area encompasses the geographical location of the target device.

As in block 818, another action of the functionality 800 can be determining, based on the first mutual-overlap area, a subset of the landmark devices to use for locating the target device within a geographical region in which the landmark devices are located.

As in block 820, another action of the functionality 800 can be performing network tomography to determine an actual data-transmission path from each landmark device in the subset to the target device.

As in block 822, another action of the functionality 800 can be determining a direct travel distance from each landmark device in the subset to the target device based on the actual data-transmission path from the landmark device to the target device.

As in block 824, another action of the functionality 800 can be determining, for each landmark device in the subset, a geographical bounding circle, wherein the bounding circle is centered at the landmark device and the radius of the bounding circle substantially equals the direct travel distance from the landmark device to the target device; and As in block 826, another action of the functionality 800 can be determining a second mutual-overlap area that overlaps with the bounding circle of each landmark device in the subset, wherein the first mutual-overlap area encompasses at least part of the second mutual-overlap area and the second mutual-overlap area encompasses the geographical location of the target device.

Figure 9:
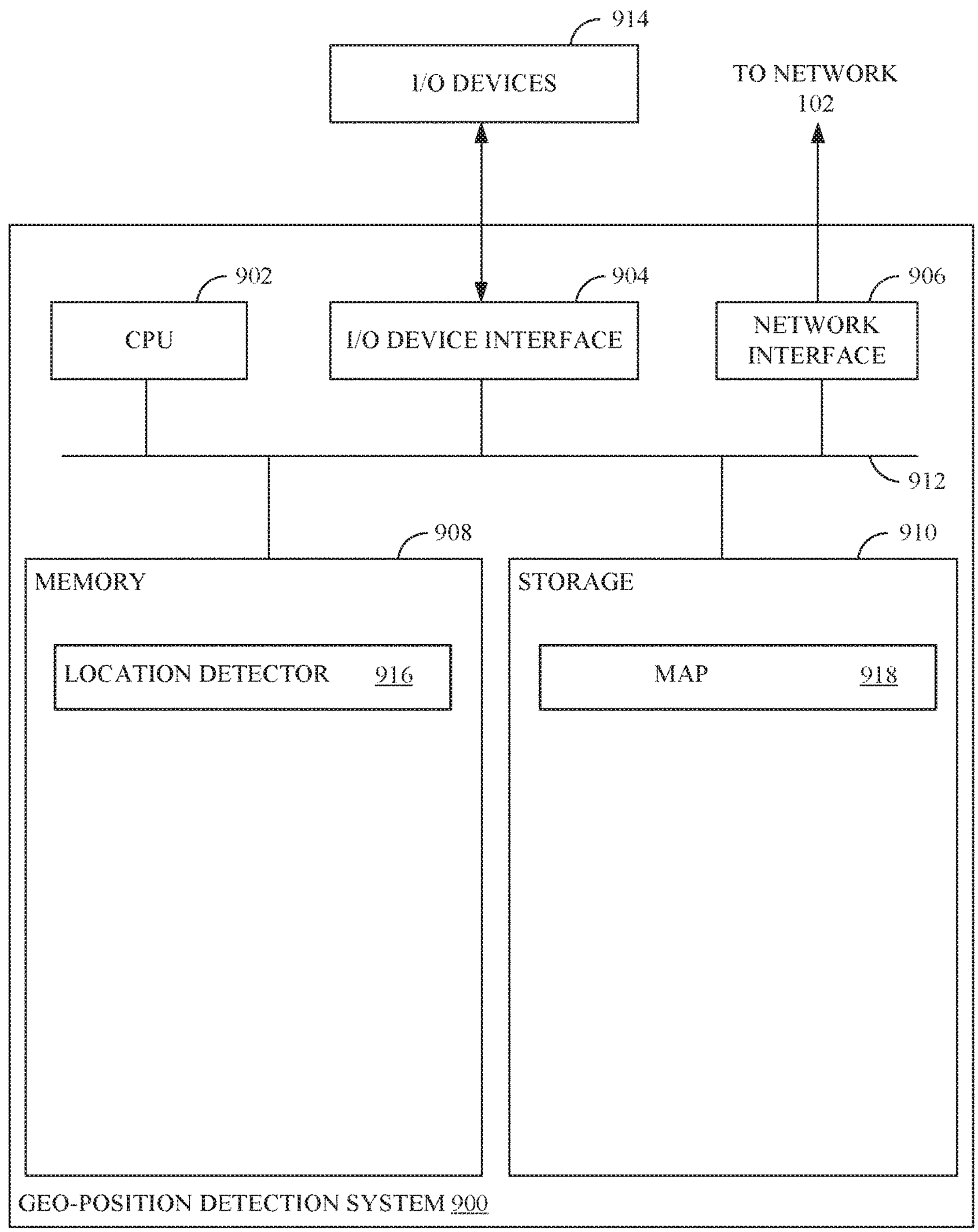
FIG. 9 illustrates a geo-position detection system that detects the location of a target device associated with an IP address, according to one embodiment.

FIG. 9 illustrates a geo-position detection system 900 that detects the location of a target device associated with an IP address, according to one embodiment. As shown, the geo-position detection system 900 includes a central processing unit (CPU) 902, one or more input/output (I/O) device interfaces 904 which may allow for the connection of various I/O devices 914 (e.g., keyboards, displays, mouse devices, pen input, etc.) to the geo-position detection system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 can represent a single CPU, multiple CPUs, a single CPU having multiple processing cores, and the like. Additionally, the memory 906 represents random access memory. Furthermore, the storage 910 may be a disk drive. Although shown as a single unit, the storage 910 may be a combination of fixed and/or removable storage devices, such as fixed disc drives, removable memory cards or optical storage, network attached storage (NAS), or a storage area-network (SAN).

As shown, memory 908 includes a location detector 916 and storage includes a map 918. The location detector 916 is configured to determine where a target device is located within a geographical region depicted by the map 918. To determine where the target device is located, the location detector 916 selects a set of landmark devices.

For each of the landmark devices, the location detector 916 determines a respective corresponding network-communication delay to the target device. Also, for each of the landmark devices in the set, the location detector 916 also determines a respective network-communication delay to each other device. Each the network-communication delays indicates how long it takes for data packets to travel between an IP addresses of the target device and an IP address of the corresponding landmark device.

Next, the location detector 916 generates a first sequence of the landmark devices in the set based on the network-communication delays to the target device. Specifically, each of the landmark devices is positioned in order in the first sequence according to the corresponding network-communication delay between the respective device and the target device.

For each of the landmark devices, the location detector 916 also generates a respective sequence of the other landmark devices included in the set. Specifically, in a sequence for a particular device in the set, each other device in the set is positioned in order according to the corresponding network-communication delay to the particular device from the other device.

Next, the location detector 916 generates, based on the generated sequences, a ranking of the landmark devices in the set relative to the target device. The location detector 916 identifies a plurality of pairs of devices in the set. For each pair of devices in the set, the location detector 916 determines a respective boundary across the map 918. For each pair, the generated ranking indicates a first device of the pair is closer to the target device than a second landmark device of the pair. Each boundary divides the geographical region into a target partition that includes the first device of the pair and a second partition that includes the second device of the pair.

After determining the boundaries, the location detector 916 determines a first mutual-overlap area that overlaps with the target partition of each pair and infers that the target device is located within the first mutual-overlap area.

Based on the first mutual-overlap area, the location detector 916 selects a subset of the landmark devices to use for locating the target device within a geographical region. To pinpoint the location of the target device with finer granularity, the location detector 916 can perform network tomography to determine actual data-transmission paths from the landmark devices in the subset to the target device. The location detector 916 determines direct travel distances from the landmark devices in the subset to the target device based on the actual data-transmission paths (e.g., by projecting the actual data-transmission paths onto the map 918 and applying a scale of the map 918).

Once the direct travel distances have been determined, the location detector 916 determines geographical bounding circles for the landmark devices in the subset. Each bounding circle is centered at one of the landmark devices and has a radius equal to (or approximately equal to) the direct travel distance from the device at the center of the bounding circle to the target device.

Next, the location detector 916 determines a second mutual-overlap area in the map 918 where the determined bounding circles overlap. The target device is located within the second mutual-overlap area. Typically, the first mutual-overlap area encompasses second mutual-overlap area. However, if the first mutual-overlap area only encompasses part of the second mutual overlap area, the target device is located in a sector where the first mutual-overlap area and the second mutual-overlap area overlap with each other.

In the foregoing, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a location detector) or related data available in the cloud. For example, the location detector could execute on a computing system in the cloud and determine a geographical location of a target device associated with an IP address. In such a case, the location detector could use methods described herein to locate the target devices and store an indication of the location at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for determining a geographical location of a target device associated with a network address used for communicating within a computer network, the method comprising:

determining, for each landmark device in a set of landmark devices, a corresponding network-communication delay between the landmark device and the target device;

generating a first sequence of the set of landmark devices, wherein each landmark device is positioned in the first sequence according to the corresponding network-communication delay between the landmark device and the target device;

determining, for each landmark device in the set of landmark devices, a respective network-communication delay between the landmark device and each other landmark device in the set of landmark devices;

generating, for each landmark device in the set of landmark devices, a respective sequence of the other landmark devices in the set of landmark devices, wherein each other landmark device is positioned in the respective sequence according to the respective network-communication delay between the landmark device and the other landmark device;

generating, based on the first sequence and based on each respective sequence, a ranking of the landmark devices relative to the target device;

identifying a plurality of pairs of landmark devices in the set of landmark devices;

for each pair of landmark devices and based on the ranking, determining a boundary that divides the geographical region into a target partition and a second partition, wherein the target partition includes a first landmark device of the pair and the second partition includes a second landmark device of the pair; and determining a first mutual-overlap area that overlaps with the target partition of each pair, wherein the first mutual-overlap area encompasses the geographical location of the target device.

2. The method of claim 1, further comprising:

determining, based on the first mutual-overlap area, a subset of the landmark devices to use for locating the target device within a geographical region in which the landmark devices are located;

performing network tomography to determine an actual data-transmission path from each landmark device in the subset to the target device.

3. The method of claim 2, further comprising:

determining a direct travel distance from each landmark device in the subset to the target device based on the actual data-transmission path from the landmark device to the target device.

4. The method of claim 3, further comprising:

determining, for each landmark device in the subset, a geographical bounding circle, wherein the bounding circle is centered at the landmark device and a radius of the bounding circle substantially equals the direct travel distance from the landmark device to the target device; and determining a second mutual-overlap area that overlaps with the bounding circle of each landmark device in the subset, wherein the first mutual-overlap area encompasses at least part of the second mutual-overlap area and the second mutual-overlap area encompasses the geographical location of the target device.

5. The method of claim 1, further comprising:

identifying at least one mobile device connected to the network, wherein the mobile device includes a global positioning system (GPS); and determining, based on measurements associated with the GPS, a rate of movement associated with the mobile device;

comparing the rate of movement to a threshold rate; and determining whether to include the at least one mobile device in the set of landmark devices based on the comparison.

6. The method of claim 1, wherein generating the ranking includes applying a maximum a posteriori (MAP) sequence-matching method to the first sequence and each respective sequence.

7. The method of claim 1, wherein:

the boundary that divides the geographical region into the target partition and the second partition for each pair of landmark devices is a line;

the first partition includes each landmark device that the ranking indicates is closer to the first landmark device of the pair; and the second partition includes each landmark device that the ranking indicates is closer to the second landmark device of the pair.

8. A non-transitory computer-readable storage medium containing instructions that, when executed by one or more processors, perform an operation for determining a geographical location of a target device associated with a network address used for communicating within a computer network, the operation comprising:

determining, for each landmark device in a set of landmark devices, a corresponding network-communication delay between the landmark device and the target device;

generating a first sequence of the set of landmark devices, wherein each landmark device is positioned in the first sequence according to the corresponding network-communication delay between the landmark device and the target device;

determining, for each landmark device in the set of landmark devices, a respective network-communication delay between the landmark device and each other landmark device in the set of landmark devices;

generating, for each landmark device in the set of landmark devices, a respective sequence of the other landmark devices in the set of landmark devices, wherein each other landmark device is positioned in the respective sequence according to the respective network-communication delay between the landmark device and the other landmark device;

generating, based on the first sequence and based on each respective sequence, a ranking of the landmark devices relative to the target device;

identifying a plurality of pairs of landmark devices in the set of landmark devices;

for each pair of landmark devices and based on the ranking, determining a boundary that divides the geographical region into a target partition and a second partition, wherein the target partition includes a first landmark device of the pair and the second partition includes a second landmark device of the pair; and determining a first mutual-overlap area that overlaps with the target partition of each pair, wherein the first mutual-overlap area encompasses the geographical location of the target device.

9. The non-transitory computer-readable storage medium of claim 8, wherein the operation further comprises:

determining, based on the first mutual-overlap area, a subset of the landmark devices to use for locating the target device within a geographical region in which the landmark devices are located;

performing network tomography to determine an actual data-transmission path from each landmark device in the subset to the target device.

10. The non-transitory computer-readable storage medium of claim 9, wherein the operation further comprises:

determining a direct travel distance from each landmark device in the subset to the target device based on the actual data-transmission path from the landmark device to the target device.

11. The non-transitory computer-readable storage medium of claim 10, wherein the operation further comprises:

determining, for each landmark device in the subset, a geographical bounding circle, wherein the bounding circle is centered at the landmark device and a radius of the bounding circle substantially equals the direct travel distance from the landmark device to the target device; and determining a second mutual-overlap area that overlaps with the bounding circle of each landmark device in the subset, wherein the first mutual-overlap area encompasses at least part of the second mutual-overlap area and the second mutual-overlap area encompasses the geographical location of the target device.

12. The non-transitory computer-readable storage medium of claim 8, wherein the operation further comprises:

identifying at least one mobile device connected to the network, wherein the mobile device includes a global positioning system (GPS); and determining, based on measurements associated with the GPS, a rate of movement associated with the mobile device;

comparing the rate of movement to a threshold rate; and determining whether to include the at least one mobile device in the set of landmark devices based on the comparison.

13. The non-transitory computer-readable storage medium of claim 8, wherein:

the boundary that divides the geographical region into the target partition and the second partition for each pair of landmark devices is a line;

the first partition includes each landmark device that the ranking indicates is closer to the first landmark device of the pair; and the second partition includes each landmark device that the ranking indicates is closer to the second landmark device of the pair.

* * * * *